United States Patent
Nishino et al.

(10) Patent No.: US 9,368,995 B2
(45) Date of Patent: Jun. 14, 2016

(54) LITHIUM ION BATTERY CHARGING METHOD AND BATTERY-EQUIPPED DEVICE

(71) Applicant: PANASONIC CORPORATION, Osaka (JP)

(72) Inventors: Hajime Nishino, Nara (JP); Mitsuhiro Takeno, Osaka (JP); Mikinari Shimada, Osaka (JP); Masato Fujikawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 162 days.

(21) Appl. No.: 14/344,893

(22) PCT Filed: Sep. 27, 2012

(86) PCT No.: PCT/JP2012/006184
§ 371 (c)(1),
(2) Date: Mar. 13, 2014

(87) PCT Pub. No.: WO2013/046690
PCT Pub. Date: Apr. 4, 2013

(65) Prior Publication Data
US 2014/0375279 A1  Dec. 25, 2014

(30) Foreign Application Priority Data
Sep. 30, 2011  (JP) ................. 2011-216341

(51) Int. Cl.
| | |
|---|---|
| *H01M 10/44* | (2006.01) |
| *H02J 7/00* | (2006.01) |
| *H01M 10/46* | (2006.01) |
| *H01M 10/42* | (2006.01) |
| *H02J 7/04* | (2006.01) |

(52) U.S. Cl.
CPC ............. *H02J 7/0073* (2013.01); *H01M 10/44* (2013.01); *H01M 10/443* (2013.01); *H01M 10/46* (2013.01); *H02J 7/047* (2013.01); *H01M 2010/4271* (2013.01); *H02J 7/044* (2013.01)

(58) Field of Classification Search
CPC ...... H02J 7/0091; H02J 7/0073; H02J 7/0081
USPC ........................ 320/107, 124, 125, 137, 160
See application file for complete search history.

(56) References Cited

U.S. PATENT DOCUMENTS

| | | | |
|---|---|---|---|
| 6,087,810 A | 7/2000 | Yoshida | |
| 6,414,465 B1 * | 7/2002 | Banks et al. | 320/118 |
| 2005/0194938 A1 * | 9/2005 | Sanpei | 320/141 |
| 2006/0093894 A1 | 5/2006 | Scott et al. | |
| 2011/0012563 A1 | 1/2011 | Paryani et al. | |
| 2012/0133338 A1 | 5/2012 | Suzuki et al. | |

FOREIGN PATENT DOCUMENTS

| | | |
|---|---|---|
| JP | H09121462 A | 5/1997 |
| JP | H11329512 A | 11/1999 |
| JP | 2002-203609 A | 7/2002 |
| JP | 2005-253210 A | 9/2005 |
| JP | 2008-519403 A | 6/2008 |
| JP | 2011-024412 A | 2/2011 |
| WO | 2006-050117 A2 | 5/2006 |
| WO | 2011-074199 A1 | 6/2011 |

OTHER PUBLICATIONS

International Search Report issued in International Application No. PCT/JP2012/006184, with Date of mailing Dec. 11, 2012, with English Translation.

* cited by examiner

*Primary Examiner* — Edward Tso
(74) *Attorney, Agent, or Firm* — McDermott Will & Emery LLP

(57) ABSTRACT

In a charging method for a lithium ion battery, constant current charging of the lithium ion battery is performed. The constant current charging includes at least three consecutive charging stages. The at least three consecutive charging stages include consecutive first, second, and third charging stages. The second charging stage has a set current value which is set lower than set current values of the first and third charging stages.

14 Claims, 7 Drawing Sheets

FIG. 5

| | CHARGING SYSTEM | TEMPERATURE | SOC(%) | | | | | (4.2V) | total charge time | CAPACITY MAINTENANCE RATIO AT POINT OF 500 CYCLES |
|---|---|---|---|---|---|---|---|---|---|---|
| | | | 0-40 | 40-60 REGION A | 60-80 | 80-(4.2V) | | | | |
| COMPARATIVE EXAMPLE1 | CC | 25°C | 0.5 | 0.5 | 0.5 | 0.5 | | CV | 2.9h | 38% |
| COMPARATIVE EXAMPLE2 | | | 0.3 | 0.3 | 0.3 | 0.3 | | CV | 4.0h | 85% |
| COMPARATIVE EXAMPLE3 | | | 0.75 | 0.5 | 0.3 | 0.3 | | CV | 2.9h | 47% |
| WORKING EXAMPLE1 | | | 0.75 | 0.3 | 0.75 | 0.75 | | CV | 2.8h | 68% |
| WORKING EXAMPLE2 | | | 0.75 | 0.3 | 0.5 | 0.5 | | CV | 2.9h | 71% |
| WORKING EXAMPLE3 | | | 0.75 | 0.3 | 0.5 | 0.3 | | CV | 2.9h | 73% |
| WORKING EXAMPLE4 | | | 0.5 | 0.3 | 0.5 | 0.3 | | CV | 3.2h | 74% |
| WORKING EXAMPLE5 | | | 0.75 | 0.3 | 0.5 | 0.5 | | CV | 2.7h | 80% |
| WORKING EXAMPLE6 | | 45°C | 0.75 | 0.4 | 0.5 | 0.5 | | CV | 2.5h | 75% |
| WORKING EXAMPLE7 | | | 0.75 | 0.5 | 0.5 | 0.5 | | CV | 2.4h | 59% |
| WORKING EXAMPLE8 | | 15°C | 0.75 | 0.3 | 0.5 | 0.5 | | CV | 3.1h | 57% |
| WORKING EXAMPLE9 | | | 0.75 | 0.2 | 0.5 | 0.5 | | CV | 3.4h | 68% |
| WORKING EXAMPLE10 | | | 0.75 | 0.1 | 0.5 | 0.5 | | CV | 3.8h | 69% |

FIG. 6

| | CHARGING SYSTEM | TEMPERATURE | SOC(%) | | | | (4.2V) | CAPACITY MAINTENANCE RATIO AT POINT OF 500 CYCLES |
| --- | --- | --- | --- | --- | --- | --- | --- | --- |
| | | | 0-40 | 40-60 REGION A | 60-80 | 80-(4.2V) | | |
| COMPARATIVE EXAMPLE 4 | CW | 25°C | EQUIVALENT TO 0.5 | | | | CV | 41% |
| WORKING EXAMPLE 11 | | | 0.75 | 0.3 | 0.5 | 0.5 | CV | 73% |
| WORKING EXAMPLE 12 | | | 0.75 | 0.3 | 0.5 | 0.3 | CV | 75% |

FIG. 7

| | CHARGING SYSTEM | TEMPERATURE | SOC(%) | | | | (4.2V) | CAPACITY MAINTENANCE RATIO AT POINT OF 600 CYCLES |
| --- | --- | --- | --- | --- | --- | --- | --- | --- |
| | | | 0-40 | 40-60 REGION A | 60-80 | 80-(4.2V) | | |
| WORKING EXAMPLE2 | CC | 25°C | 0.75 | 0.3 | 0.5 | 0.5 | CV | 52% |
| WORKING EXAMPLE13 | | | 0.75 | 0.3 | 0.5 | 0.5 | CV | 62% |

LITHIUM ION BATTERY CHARGING METHOD AND BATTERY-EQUIPPED DEVICE

RELATED APPLICATIONS

This application is a national phase application of the U.S. National Phase under 35 U.S.C. §371 of International Application No. PCT/JP2012/006184, filed on Sep. 27, 2012, which in turn claims the benefit of Japanese Application No. 2011-216341, filed on Sep. 30, 2011, the disclosures of which Applications are incorporated by reference herein.

TECHNICAL FIELD

The present invention relates to a lithium ion battery charging method and a battery-equipped device and, more particularly, to a lithium ion battery charging method and a battery-equipped device in which charging is performed in multiple stages.

BACKGROUND ART

In recent years, there has been increasing expectation for secondary batteries from an environmental point of view in a global scale. That is, the secondary batteries attract attention as important key items for a reduction in $CO_2$ emissions and are used as power sources for an electric vehicle (EV), a hybrid electric vehicle (HEV), an electric motorcycle and the like, or used in combination with natural energy power generation such as solar power generation and wind power generation. Above all, lithium ion secondary batteries are particularly highly expected because energy density is high and a reduction in size and weight is expected.

When the lithium ion secondary battery is charged at a voltage not less than a set voltage, battery characteristics are seriously spoiled and deterioration in a capacity and direct current internal resistance (hereinafter referred to as DC-IR) of the battery involved in a charging and discharging cycle is accelerated. Therefore, as a general charging method for the lithium ion secondary battery, charging is performed at a constant current until a battery voltage reaches the set voltage and, thereafter, constant voltage charging for continuously controlling a charging current is performed such that the battery voltage does not rise to be not less than the set voltage. In the EV, the HEV, and the like, charging is performed with constant watt instead of the constant current. In the following description, the constant current is referred to as CC (Constant Current), the constant voltage is referred to as CV (Constant Voltage), and constant watt is referred to as CW (Constant Watt).

In the lithium ion secondary battery, in general, a carbon material is used as a negative electrode material. When the battery is charged, lithium ions emitted from a positive electrode are inserted into the carbon material of a negative electrode. During the charging, when the battery is charged with an extremely high current value exceeding the ability of the battery, an insertion reaction of the lithium ions into the carbon material is late for the charging, and the lithium ions are therefore sometimes precipitated as lithium metal. In this case, the precipitated lithium metal reacts with an electrolytic solution and changes to irreversible lithium compound not contributing to charging and discharging. As a result, the capacity of the battery decreases. The capacity of the battery decreases earlier than when the battery is used within a range of a standard charging current. That is, when charging is performed at a large charging current, time required for the charging may be reduced and, on the other hand, the battery is damaged and the life characteristics of the secondary battery are spoiled.

It is impossible to use the battery during the charging. Therefore, in general, there is a demand for a battery having a short charging time. However, it is difficult to realize both a high capacity and quick charge. In order to design a battery that may be quickly charged, the capacity has to be sacrificed to a certain degree.

Therefore, Patent Document 1 proposes to perform CC charging and CV charging in multiple stages and reduce a set current value according to a state of charge (hereinafter, SOC) to thereby reduce a charging time while reducing damage to a battery.

Like Patent Document 1, Patent Document 2 proposes to combine CC charging and CV charging in multiple stages to thereby set an electric current small at a high SOC and use a pulse wave by a ripple current to prevent a battery voltage from rising to be not less than a set voltage.

Further, Patent Document 3 proposes to, during manufacturing of a battery, form a uniform film on the surface of an active material by performing CV charging for keeping a voltage constant at a voltage at which a chemical reaction for forming a film occurs in initial charging, combine CC charging and CV charging in multiple stages to form layers of films, and improve the characteristics of the battery.

If the quick charge is realized by contrivance of only a charging method without spoiling the life characteristics of the battery, it is possible to improve convenience of the battery while maintaining the battery capacity.

The potential of the negative electrode at the time when an electric current is not fed (Open Circuit Voltage; hereinafter referred to as OCV) is present in a position higher than potential at which lithium is precipitated (0V vs. Li). In normal charging in which a current value recommended by a battery manufacturer is used, in general, potential at the time when an electric current is fed (Close Circuit Voltage; hereinafter referred to as CCV) is designed not to be the potential at which lithium is precipitated.

However, when the quick charge is performed with a larger current value, if it is assumed that the resistance of the negative electrode is constant, the CCV of the negative electrode falls to be not higher than the potential at which lithium is precipitated in a region of a high SOC where the potential of the negative electrode falls. Lithium is precipitated on the negative electrode. As a result, deterioration of the battery is accelerated by the mechanism described above.

Consequently, Patent Document 1 proposes control for reducing an electric current as the SOC increases, that is, reducing an electric current as the OCV of the negative electrode decreases. As a result, in an initial period of charging, the quick charge is possible with a large current value. However, in the latter half of the charging, since a current value decreases more than necessary, a reduction in a charging time may not be efficiently carried out.

In Patent Document 2, control for reducing an electric current through the CV charging is performed in the middle period of the charging. However, in the CV charging, it takes time to reduce the electric current to a target value. Therefore, damage to the battery progresses. Further, a current value continues to decrease even after the electric current reaches a target current value. Hence, a charging time is required more than necessary. That is, in the control of the electric current by the CV charging, a sufficient effect may not be obtained for any of the purpose of suppression of damage to the battery and the purpose of reduction in the charging time.

Further, Patent Document 3 proposes multistage charging of CC charging and CV charging same as those in Patent Documents 1 and 2. However, the multistage charging is performed only during manufacturing of a battery and has a purpose of accurately performing a chemical reaction. Therefore, the multistage charging is carried out with an extremely low current value (0.2 It) compared with the quick charge. Since acceleration of the chemical reaction is the purpose, a target of the multistage charging is a charging control method only during the initial charging. A set value of a voltage is set according to potential at which a film forming reaction is promoted rather than an SOC.

Patent Document 1: Japanese Patent Application Laid-open No. 2011-24412

Patent Document 2: Japanese Patent Application Laid-open No. H9-121462

Patent Document 3: Japanese Patent Application Laid-open No. 2002-203609

SUMMARY OF INVENTION

Therefore, it is an object of the present invention to provide an efficient lithium ion battery charging method for enabling quick charge without spoiling life characteristics and a battery-equipped device in which the charging method is used.

A lithium ion battery charging method according to an aspect of the present invention is a lithium ion battery charging method which performs constant current charging of a lithium ion battery. The constant current charging includes at least three consecutive charging stages. The at least three consecutive charging stages include consecutive first, second, and third charging stages. The second charging stage has a set current value which is set lower than set current values of the first and third charging stages.

A lithium ion battery charging method according to another aspect of the present invention is a lithium ion battery charging method which performs constant watt charging of a lithium ion battery. The constant watt charging includes at least three consecutive charging stages. The at least three consecutive charging stages include consecutive first, second, and third charging stages. The second charging stage has a set watt value which is set lower than set watt values of the first and third charging stages.

A battery-equipped device according to an aspect of the present invention includes: a lithium ion battery; and a charging controller which is configured to control charging of the lithium ion battery using the above-described lithium ion battery charging method.

According to the present invention, by optimizing a lithium ion secondary battery charging method, it is possible to reduce time required for charging without sacrificing the capacity and the life characteristics of the battery and improve convenience of the battery.

BRIEF DESCRIPTION OF DRAWINGS

FIG. 5 is a diagram showing results of comparative examples 1 to 3 and working examples 1 to 10.

FIG. 6 is a diagram showing results of a comparative example 4 and working examples 11 and 12.

FIG. 7 is a diagram showing results of working examples 2 and 13.

DESCRIPTION OF EMBODIMENTS

An embodiment of the present invention is described below with reference to the drawings. Note that the embodiment described below is an example of embodiment of the present invention and does not limit a technical scope of the present invention.

A lithium ion battery charging method in this embodiment is a lithium ion battery charging method which performs constant current charging or constant watt charging of a lithium ion battery. The constant current charging includes at least three consecutive constant current charging stages. The at least three consecutive constant current charging stages include consecutive first, second, and third constant current charging stages. The second constant current charging stage has a set current value which is set lower than set current values of the first and third constant current stages.

The constant watt charging includes at least three consecutive constant watt charging stages. The at least three consecutive constant watt charging stages include consecutive first, second, and third constant watt charging stages. The second constant watt charging stage has a set watt value which is set lower than set watt values of the first and third charging stages.

It is preferable that a lithium ion secondary battery used in this embodiment includes a positive electrode, a negative electrode, a separator arranged between the positive electrode and the negative electrode, and a nonaqueous electrolyte, that the negative electrode includes a negative electrode core material and a negative electrode mixture layer adhering to the negative electrode core material, and that the negative electrode mixture layer includes graphite particles and a binder which bonds the graphite particles.

Figure 1:
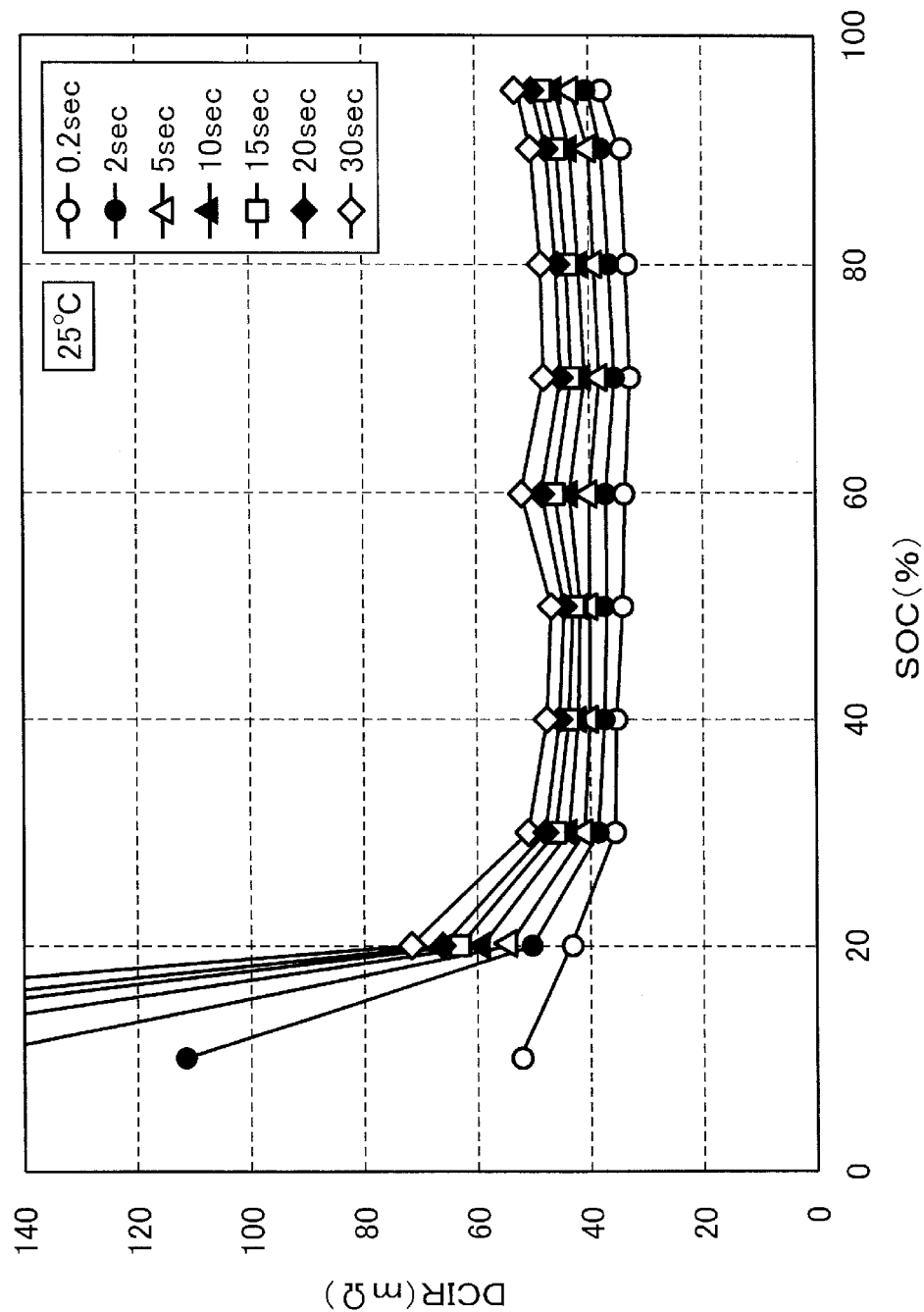
FIG. 1 is a graph showing a change in DC-IR depending on an SOC of a lithium ion secondary battery used in an embodiment of the present invention.

DC-IR of this lithium ion secondary battery in which the graphite material is used for the negative electrode has been analyzed in detail, and a resistance profile shown in FIG. 1 has been obtained. The ordinate indicates the DC-IR and the abscissa indicates an SOC. FIG. 1 is a graph obtained by performing charging by a fixed amount at a time from a discharged state at 25° C. and performing measurement of DC-IR at respective SOCs. In FIG. 1, pulse charging is performed with a current value set to 0.5 It and the DC-IR is measured. The measurement is performed at seven kinds of pulse width of ON in the pulse charging, i.e., 0.2 second, 2 seconds, 5 seconds, 10 seconds, 15 seconds, 20 seconds, and 30 seconds. Pulse width of OFF in the pulse charging is set to 30 seconds. Note that 1 It is a current value with which an entire battery capacity is discharged in one hour when a full-charge battery is discharged.

As shown in FIG. 1, an increase in the DC-IR has been confirmed at the SOC of not more than 30%, at the SOC of 60%, and at the SOC of not less than 90% by the measurement. In particular, it is seen that the increase at the SOC of 60% occurs only in the pulse charging at the pulse time (the pulse width of ON) not less than 10 seconds. The increase occurs only in the pulse charging at the pulse time (the pulse width of ON) not less than 10 seconds. Hence, it is seen that the DC-IR is a resistance component that develops relatively late. Therefore, it is anticipated that this resistance component is not moving resistance of lithium ions in an electrolyte but moving resistance of the lithium ions in a solid phase in an active material.

As a result of further earnest researches, it has been found that the increase in the DC-IR at the SOC of not more than 30% and at the SOC of not less than 90% is caused by mixture of the positive electrode and the negative electrode, that is, both of the positive electrode and the negative electrode, and that the increase in the DC-IR at the SOC of 60% is caused by the negative electrode alone.

In the insertion reaction of the Li ion into the graphite material, a crystal state of the graphite changes in stages as an insertion amount of the Li ions increases. The crystal state of the graphite changes to a first (1st) stage, a second (2nd) stage, and a third (3rd) stage in order as the battery is discharged from a full-charge state. It has been confirmed that the increase in the DC-IR of the negative electrode occurs near a point at which the crystal state of the graphite called stage shifts to another stage.

Consequently, it is surmised that the increase in the DC-IR at the SOC of 60% temporarily occurs in the negative electrode when a stage structure (the crystal state) of the graphite, into which the Li ions of the negative electrode are inserted, changes from the 2nd stage to the 1st stage during charging, the change being opposite to a change during discharging.

Figure 2:
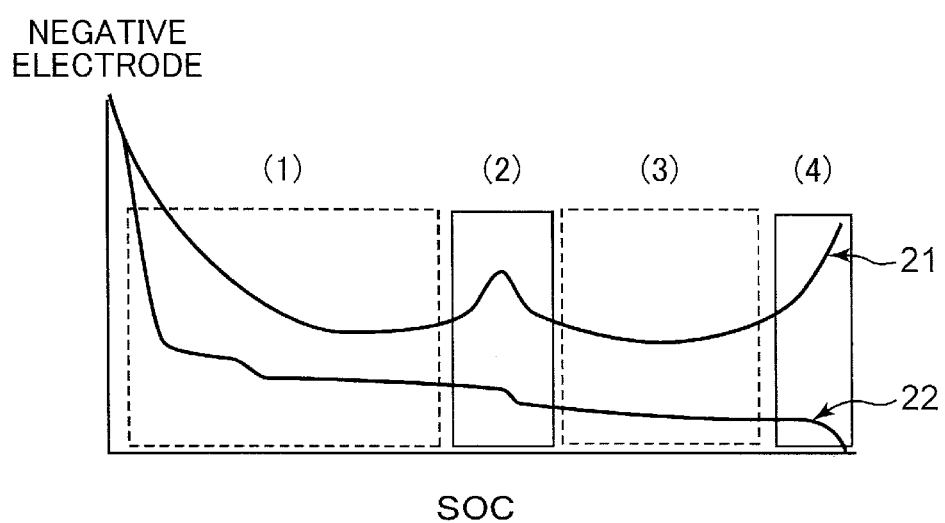
FIG. 2 is a schematic diagram showing changes in an OCV and the DC-IR depending on the SOC of the lithium ion secondary battery used in the embodiment of the present invention.

FIG. 2 schematically shows a change in DC-IR 21 and potential of the negative electrode, in particular, a change in an OCV 22 with respect to a change in the SOC. According to a relation between the DC-IR 21 and the OCV 22 of the negative electrode, the SOC on the abscissa is divided into four regions (1), (2), (3), and (4). Lithium is less easily precipitated irrespective of the magnitude of the DC-IR 21 of the negative electrode in the region (1), because the OCV 22 of the negative electrode is high. Lithium is easily precipitated in the region (2), because the DC-IR 21 of the negative electrode is large and the OCV 22 of the negative electrode is low. Lithium is relatively less easily precipitated in the region (3), because the OCV 22 of the negative electrode is low but the DC-IR 21 is also small. Lithium is easily precipitated in the region (4), because the DC-IR 21 of the negative electrode is large and the OCV 22 of the negative electrode is also low.

When the characteristics of the regions are summarized, the regions (1) and (3) may be described as regions in which lithium is less easily precipitated even if a current value is relatively large, and the regions (2) and (4) may be described as regions in which lithium is precipitated unless a current value is limited to be small.

Consequently, it is not necessary to simply reduce a current value depending on the negative electrode OCV as described in Patent Document 1. It is possible to increase the current value again in the region (3) as long as an electric current is limited only in the regions (2) and (4). Thus, it is possible to carry out more efficient quick charge without damaging the battery.

Therefore, in the lithium ion secondary battery charging method according to this embodiment, the constant current charging of the lithium ion battery is performed. Note that constant voltage charging may be performed following the constant current charging. The constant current charging includes at least three consecutive constant current charging stages.

In this embodiment, the constant current charging includes, for example, a constant current charging stage from a charging start to the SOC of 40% (corresponding to the region (1) in FIG. 2), a constant current charging stage from the SOC of 40% to the SOC of 60% (corresponding to the region (2) in FIG. 2), a constant current charging stage from the SOC of 60% to the SOC of 80% (corresponding to the region (3) in FIG. 2), and a constant current charging stage from the SOC of 80% to a charging voltage of 4.2 V (corresponding to the region (4) in FIG. 2).

A set current value in the constant current charging stage from the SOC of 40% to the SOC of 60% (equivalent to an example of the second charging stage) is set lower than set current values in the constant current charging stages before and after thereof. That is, a set current value in the constant current charging stage from the SOC of 40% to the SOC of 60% (equivalent to an example of the second charging stage) is set lower than set current values in the constant current charging stage from the charging start to the SOC of 40% (equivalent to an example of the first charging stage) and in the constant current charging stage from the SOC of 60% to the SOC of 80% (equivalent to an example of the third charging stage). Consequently, it is possible to efficiently perform the quick charge in a shortest time without damaging the battery.

On the other hand, in the lithium ion secondary battery charging method according to this embodiment, constant watt charging of the lithium ion battery may be performed. Note that the constant voltage charging may be performed following the constant watt charging. The constant watt charging includes at least three consecutive constant watt charging stages.

In this embodiment, the constant watt charging includes, for example, a constant watt charging stage from a charging start to the SOC of 40% (corresponding to the region (1) in FIG. 2), a constant watt charging stage from the SOC of 40% to the SOC of 60% (corresponding to the region (2) in FIG. 2), a constant watt charging stage from the SOC of 60% to the SOC of 80% (corresponding to the region (3) in FIG. 2), and a constant watt charging stage from the SOC of 80% to a charging voltage of 4.2 V (corresponding to the region (4) in FIG. 2).

A set watt value in the constant watt charging stage from the SOC of 40% to the SOC of 60% (equivalent to an example of the second charging stage) is set lower than set watt values in the constant watt charging stages before and after thereof. That is, a set watt value in the constant watt charging stage from the SOC of 40% to the SOC of 60% (equivalent to an example of the second charging stage) is set lower than set watt values in the constant watt charging stage from the charging start to the SOC of 40% (equivalent to an example of the first charging stage) and in the constant watt charging stage from the SOC of 60% to the SOC of 80% (equivalent to an example of the third charging stage). Consequently, it is also possible to efficiently perform the quick charge in a shortest time without damaging the battery.

In the charging system for the lithium ion secondary battery including the graphite material as the negative electrode active material, a region in which the second charging stage is performed (hereinafter referred to as region A) includes a charging state including a point when the charging state (the crystal state) of the graphite material used for the negative electrode of the lithium ion secondary battery changes from the 2nd stage to the 1st stage, that is, the region (2) in FIG. 2. In the region (2), since the DC-IR of the negative electrode is large, it is possible to suppress damage to the battery by reducing a charging current.

Further, on the basis of values of the DC-IR of the battery measured with a direct current by changing a state of charge from a discharged state in a charging direction in the battery, the region A includes a region in which the values of the DC-IR increase in a period other than an initial period of the charging and an end period of the charging. That is, the region A does not include regions in which both the DC-IRs of the positive electrode and of the negative electrode increase in the initial period of the charging and in the end period of the charging. And, the region A includes the above region (2) in which the charging state of the negative electrode (the crystal state of the graphite) changes from the 2nd stage to the 1st stage in a middle period of the charging, and in which only the resistance (the DC-IR) of the negative electrode increases. As just described, in this embodiment, in the middle period of the constant current charging or the constant watt charging, the set current value or the set watt value in the SOC, in which the resistance (the DC-IR) of the negative electrode increases, is set small compared with the set current values or the set watt values before and after the middle period (lower side and higher side in the SOC).

It is assumed that the position of the region (2) changes because a battery in use is replaced or the battery is deteriorated. When the region A in which a charger reduces a charging current and the region (2) in which the negative electrode DC-IR of the battery increases do not coincide with each other because of any one of the reasons, it is likely that not only efficiency of the quick charge falls but also deterioration of the battery is accelerated.

In order to solve such a problem, it is desirable to perform DC-IR measurement regularly or irregularly, and to adjust the position of the region A in which the constant current value or the constant watt value is limited according to a measured DC-IR value, that is, the region (2), to charge the battery. Consequently, it is possible to most efficiently realize a charging control method with less damage to the battery in accordance with a change in the battery.

The above-described measurement of the DC-IR is performed in a range in which the pulse width of ON in the pulse charging is not less than 5 seconds, the pulse width of OFF is about 30 seconds, and the current value is 0.2 to 10 It. Consequently, it is possible to accurately decide the region (2).

In the case of a battery used for vehicles such as an EV, an HEV, and an electric motorcycle, charging is repeated at irregular and various rates (e.g., a ratio of a charging time to a discharging time) even during use of the vehicle, that is, during discharging of the battery. That is, the charging and the discharging of the battery are switched at arbitrary timing Even in such a case, an upper limit value of a current value or a watt value during charging in the region A may be set lower than upper limit values of current values or watt values during charging in regions other than the region A. Consequently, it is possible to suppress damage to the battery.

When one or more suspensions are inserted in the region A, a delay in movement of lithium ions is eliminated. Therefore, it is possible to suppress damage to the battery.

The internal resistance of the battery changes depending on temperature. Therefore, the current value or the watt value of the above-described region A may be changed depending on the temperature of the battery or the ambient temperature of the battery. Consequently, it is possible to more efficiently realize a charging control method with less damage to the battery.

According to the control by the above-described charging control method, the life characteristics of the lithium ion battery is drastically improved, and performance and reliability for a long period of a device equipped with the lithium ion battery are remarkably improved. Examples of a battery-equipped device equipped with the lithium ion battery, charging of which is controlled by the above-described charging control method, include small information terminals such as a notebook PC and a cellular phone, power vehicles such as a hybrid electric vehicle and an electric vehicle, and a power storage device that stores electric power generated by natural energy and the like.

Figure 3:
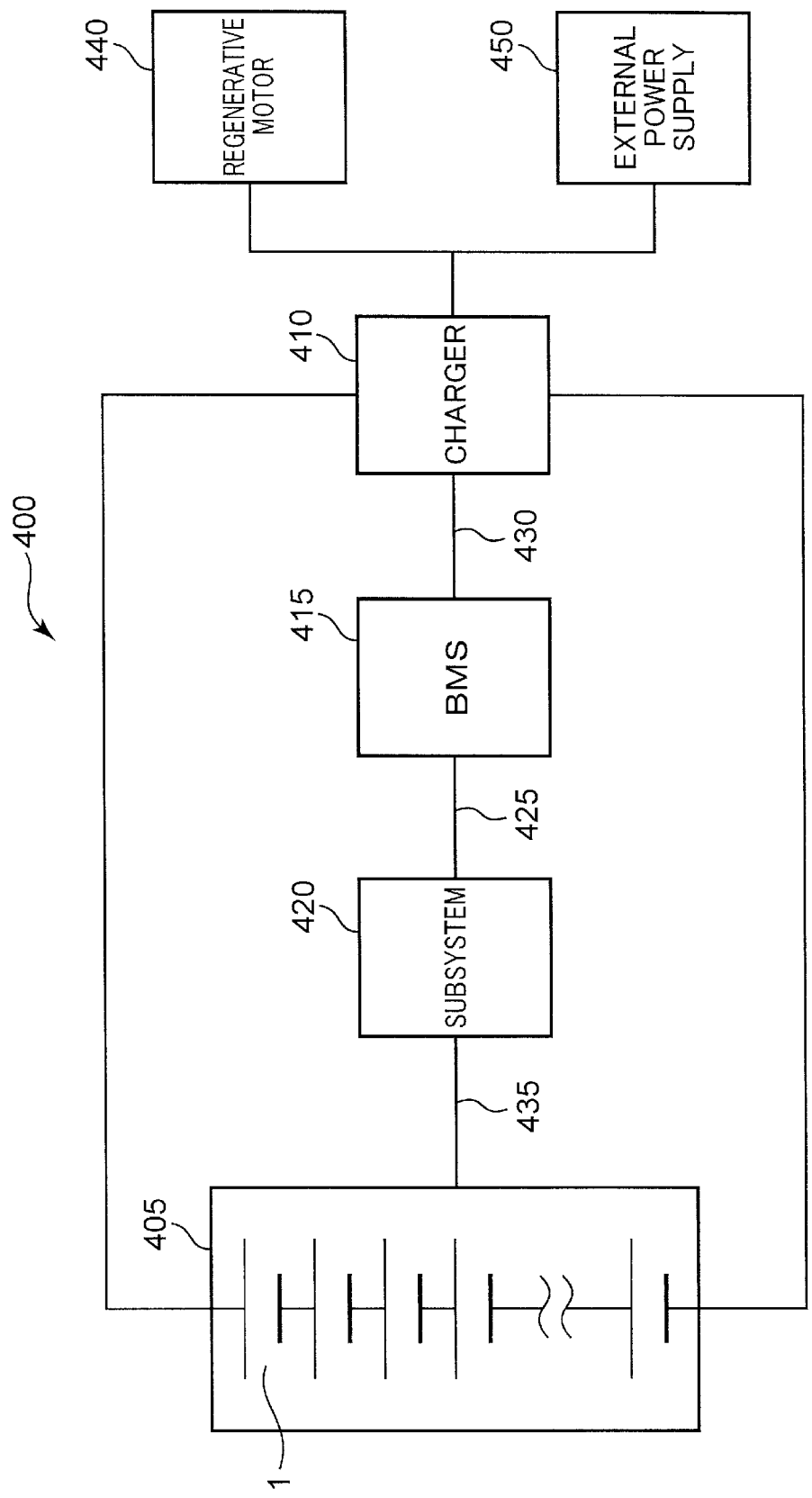
FIG. 3 is a block diagram showing the configuration of a charging system used in the embodiment of the present invention.

FIG. 3 is a block diagram showing the configuration of a charging system. For example, a preferred embodiment concerning a charging system 400 used in an electric vehicle is described using FIG. 3.

The charging system 400 includes a battery 405, a charger 410, a battery management system (BMS) 415, and a subsystem 420. A communication bus 425 connects the subsystem 420 and the BMS 415. A communication bus 430 connects the BMS 415 and the charger 410. A communication bus 435 connects the battery 405 and the subsystem 420.

The battery 405 includes lithium ion secondary batteries 1 connected in series. The lithium ion secondary battery 1 is manufactured as described below, for example. The charger 410 is connected to a regenerative motor 440 or an external power supply 450. The charger 410 receives supply of electric power from the regenerative motor 440 or the external power supply 450 and supplies a charging current and a charging voltage to the battery 405.

The subsystem 420 collects data necessary for execution of the above-described charging method concerning the battery 405 such as a voltage, an SOC, temperature, and other applicable data used by the BMS 415. The subsystem 420 detects a terminal voltage of the battery 405, for example. The subsystem 420 detects an electric current flowing in the battery 405, for example. The subsystem 420 detects temperature of the battery 405, for example. The subsystem 420 calculates an SOC of the battery 405, for example. The subsystem 420 outputs the detected voltage, the detected electric current, the detected temperature, and the calculated SOC to the BMS 415 via the communication bus 425.

The BMS 415 controls, using the data output from the subsystem 420, a charging operation by the charger 410 according to a profile established by the charging method described in the embodiment. Specifically, the BMS 415 executes constant current charging for example, on the basis of the SOC of the battery 405 output from the subsystem 420. Note that the BMS 415 may execute constant voltage charging following the constant current charging.

The BMS 415 controls the charging operation by the charger 410 by dividing, for example, the constant current charging into the constant current charging stage from a charging start to the SOC of 40%, the constant current charging stage from the SOC of 40% to the SOC of 60%, the constant current charging stage from the SOC of 60% to the SOC of 80%, and the constant current charging stage from the SOC of 80% to a charging voltage of 4.2 V.

The BMS 415 sets a set current value in the constant current charging stage from the SOC of 40% to the SOC of 60% (equivalent to an example of the second charging stage) to be lower than set current values in the constant current charging stages before and after the constant current charging stage from the SOC of 40% to the SOC of 60%. That is, the BMS 415 sets a set current value in the constant current charging stage from the SOC of 40% to the SOC of 60% to be lower than set current values in the constant current charging stage from the charging start to the SOC of 40% (equivalent to an example of the first charging stage) and in the constant current charging stage from the SOC of 60% to the SOC of 80% (equivalent to an example of the third charging stage).

Alternatively, the BMS 415 executes constant watt charging for example, on the basis of the SOC of the battery 405 output from the subsystem 420. Note that the BMS 415 may execute constant voltage charging following the constant watt charging.

The BMS 415 controls the charging operation by the charger 410 by dividing, for example, the constant watt charging into the constant watt charging stage from a charging start to the SOC of 40%, the constant watt charging stage from the SOC of 40% to the SOC of 60%, the constant watt charging stage from the SOC of 60% to the SOC of 80%, and the constant watt charging stage from the SOC of 80% to a charging voltage of 4.2 V.

The BMS 415 sets a set watt value in the constant watt charging stage from the SOC of 40% to the SOC of 60% (equivalent to an example of the second charging stage) to be lower than set watt values in the constant watt charging stages before and after the constant watt charging stage from the SOC of 40% to the SOC of 60%. That is, the BMS 415 sets a set watt value in the constant watt charging stage from the SOC of 40% to the SOC of 60% to be lower than set watt values in the constant watt charging stage from the charging start to the SOC of 40% (equivalent to an example of the first charging stage) and in the constant watt charging stage from the SOC of 60% to the SOC of 80% (equivalent to an example of the third charging stage).

The BMS 415 may change the set current value or the set watt value on the basis of the temperature output from the subsystem 420. For example, the BMS 415 may increase the set current value or the set watt value when the temperature output from the subsystem 420 rises and may reduce the set current value or the set watt value when the temperature falls. In the constant current charging stage or the constant watt charging stage from the SOC of 40% to the SOC of 60%, the BMS 415 may provide one or more suspension periods in which charging is suspended.

The BMS 415 may irregularly repeat the constant current charging during discharging of the battery 405. In this case, the BMS 415 may set an upper limit value of a current value in the constant current charging stage from the SOC of 40% to the SOC of 60% to be lower than upper limit values of current values in the constant current charging stages before and after the constant current charging stage from the SOC of 40% to the SOC of 60%. That is, the BMS 415 may set an upper limit value of a current value in the constant current charging stage from the SOC of 40% to the SOC of 60% to be lower than upper limit values of current values in the constant current charging stage from the charging start to the SOC of 40% and in the constant current charging stage from the SOC of 60% to the SOC of 80%.

The BMS 415 may irregularly repeat the constant watt charging during the discharging of the battery 405. In this case, the BMS 415 may set an upper limit value of a watt value in the constant watt charging stage from the SOC of 40% to the SOC of 60% to be lower than upper limit values of watt values in the constant watt charging stages before and after the constant watt charging stage from the SOC of 40% to the SOC of 60%. That is, the BMS 415 may set an upper limit value of a watt value in the constant watt charging stage from the SOC of 40% to the SOC of 60% to be lower than upper limit values of watt values in the constant watt charging stage from the charging start to the SOC of 40% and in the constant watt charging stage from the SOC of 60% to the SOC of 80%. In the embodiment shown in FIG. 3, the BMS 415 is equivalent to an example of the charging controller.

Note that, in FIG. 3, the battery 405 is shown as a group of battery cells connected in series. However, the arrangement of the cells may be a combination of a large number of cells connected in series and in parallel arranged differently. As another embodiment, the subsystem 420 may be a part of the BMS 415. Further, as another embodiment, the BMS 415 may be a part of the charger 410.

A negative electrode of the lithium ion battery used in this embodiment includes graphite particles as a negative electrode active material. The graphite particle is a general term of particles including a region having a graphite structure on the inside thereof. Therefore, the graphite particles include natural graphite, artificial graphite, and graphitized mesophase carbon particles.

A diffraction image of the graphite particles measured by a wide angle X-ray diffraction method has a peak attributed to a (101) plane and a peak attributed to a (100) plane. A ratio of intensity I (101) of the peak attributed to the (101) plane and intensity I (100) of the peak attributed to the (100) plane preferably satisfies $0.01 < I(101)/I(100) < 0.25$ and more preferably satisfies $0.08 < I(101)/I(100) < 0.2$. Note that the intensity of the peak means the height of the peak.

An average particle diameter of the graphite particles is preferably 14 to 25 μm and more preferably 16 to 23 μm. When the average particle diameter is included in the aforementioned range, slipperiness of the graphite particles in the negative electrode mixture layer is improved, and a filling state of the graphite particles is satisfactory, which is advantageous for improvement of bonding strength among the graphite particles. Note that the average particle diameter means a median diameter (D50) in a volume particle size distribution of the graphite particles. The volume particle size distribution of the graphite particles may be measured by a commercially available particle size distribution measurement device of a laser diffraction type, for example.

An average circularity degree of the graphite particles is preferably 0.9 to 0.95 and more preferably 0.91 to 0.94. When the average circularity degree is included in the aforementioned range, slipperiness of the graphite particles in the negative electrode mixture layer is improved. This is advantageous for improvement of a filling property of the graphite particles and improvement of bonding strength among the graphite particles. Note that the average circularity degree is represented by $4\pi S/L^2$ (where, S represents an area of an orthogonal projection image of the graphite particles and L represents circumferential length of the orthogonal projection image). For example, an average circularity degree of arbitrary one hundred graphite particles is preferably within the aforementioned range.

A specific surface area S of the graphite particles is preferably 3 to 5 m$^2$/g and more preferably 3.5 to 4.5 m$^2$/g. When the specific surface area is included in the aforementioned range, slipperiness of the graphite particles in the negative electrode mixture layer is improved. This is advantageous for improvement of bonding strength among the graphite particles. Further, it is possible to reduce a suitable amount of water-soluble polymer that covers the surfaces of the graphite particles.

In order to cover the surfaces of the graphite particles with the water-soluble polymer, it is desirable to manufacture the negative electrode with a manufacturing method described below.

A preferred manufacturing method includes a process (a process (i)) of mixing the graphite particles, water, and the water-soluble polymer dissolved in the water and drying an obtained mixture to obtain a dried mixture. For example, the water-soluble polymer is dissolved in the water to prepare a water-soluble polymer water solution. The obtained water-soluble polymer water solution and the graphite particles are mixed and, thereafter, moisture is removed to dry a mixture. The mixture is once dried in this way, whereby the water-soluble polymer efficiently adheres to the surfaces of the graphite particles and a coverage ratio of the surfaces of the graphite particles by water-soluble polymer is improved.

The viscosity of the water-soluble polymer water solution is preferably controlled to 1000 to 10000 mPa·s at 25° C. The viscosity is measured using a B-type viscometer and using a spindle of 5 mmφ at circumferential speed of 20 mm/s. An amount of the graphite particles mixed with a 100 parts by weight of the water-soluble polymer water solution is suitably 50 to 150 parts by weight.

A positive electrode is not particularly limited as long as the positive electrode may be used as a positive electrode of a nonaqueous electrolyte secondary battery. The positive electrode is obtained by, for example, applying a positive electrode mixture slurry including a positive electrode active material, a conductive agent such as carbon black, and a binder such as polyvinylidene fluoride to a positive electrode core material such as aluminum foil, drying the positive electrode mixture slurry, and rolling the positive electrode mixture slurry. As the positive electrode active material, a lithium containing transition metal complex oxide is preferable. Representative examples of the lithium containing transition metal complex oxide include $LiCoO_2$, $LiNiO_2$, $LiMn_2O_4$, and $LiMnO_2$.

Above all, the positive electrode preferably includes a complex oxide containing lithium and nickel because an effect of suppressing gas occurrence while securing a high capacity is more markedly obtained. In this case, a molar ratio of nickel to lithium contained in the complex oxide is preferably 30 to 100 mol %.

The complex oxide preferably further includes at least one kind selected out of a group including manganese and cobalt. A molar ratio of a total of manganese and cobalt to lithium is preferably not more than 70 mol %.

The complex oxide preferably further contains an element M other than Li, Ni, Mn, Co, and O. A molar ratio of the element M to lithium is preferably 1 to 10 mol %.

Examples of a specific lithium nickel containing complex oxide include a lithium nickel containing complex oxide represented by a general expression (1):

$$Li_xNi_yM_zMe_{1-(y+z)}O_{2+d} \qquad (1)$$

(M is at least one kind of element selected from the group consisting of Co and Mn, Me is at least one kind of element selected from the group consisting of Al, Cr, Fe, Mg, and Zn, and $0.98 \le x \le 1.1$, $0.3 \le y \le 1$, $0 \le z \le 0.7$, $0.9 \le (y+z) \le 1$, and $-0.01 \le d \le 0.01$ are satisfied).

As the separator, a microporous film made of polyethylene, polypropylene, or the like is generally used. The thickness of the separator is about 10 to 30 μm.

This embodiment is applicable to nonaqueous electrolyte secondary batteries having various shapes such as a cylindrical shape, a flat shape, a coin shape, and a square shape. The shapes of the batteries are not particularly limited.

WORKING EXAMPLES

Next, the present invention is specifically described on the basis of working examples and comparative examples. However, the present invention is not limited to the working examples below.

Figure 4:
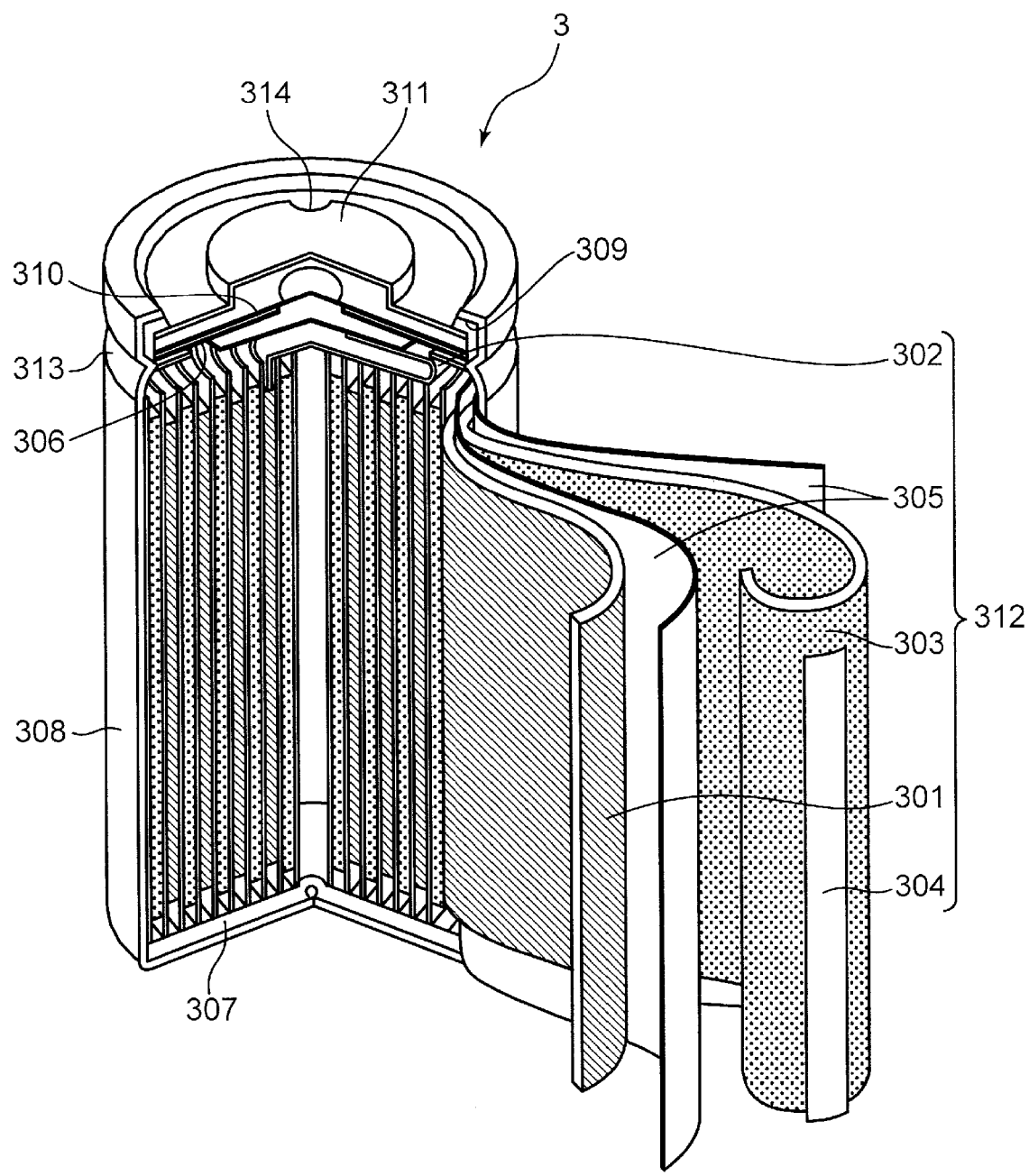
FIG. 4 is a longitudinal sectional view of the lithium ion secondary battery used in the embodiment of the present invention.

A battery 3 shown in FIG. 4 was manufactured as described below. That is, as a positive electrode plate 301, a positive electrode plate obtained by applying a positive electrode mixture to an aluminum foil collector was used. As a negative electrode plate 303, a negative electrode plate obtained by applying a negative electrode mixture to a copper foil collector was used. The thickness of a separator 305 was set to 20 μm. A positive electrode lead collector 302 and the aluminum foil collector were laser-welded. A negative electrode lead collector 304 and the copper foil collector were resistance-welded. The separator 305 was arranged between the positive electrode plate 301 and the negative electrode plate 303 and wound to configure a cylindrical electrode plate group 312. Thereafter, the electrode plate group 312 was inserted into a bottomed metallic case 308 together with an upper insulating plate 306 and a lower insulating plate 307. The negative electrode lead collector 304 was electrically connected to the bottom of the bottomed metallic case 308 by resistance-welding. The positive electrode lead collector 302 was electrically connected to a metallic filter of a sealing plate 310 including an explosion-proof valve from an open end 314 of the bottomed metallic case 308 by laser-welding. A nonaqueous electrolyte was injected from the open end of the bottomed metallic case 308. A groove 313 was cut in the open end 314 of the bottomed metallic case 308 to form a seat. The positive electrode lead collector 302 was bent. A plastic outer gasket 309, the sealing plate 310, and a positive terminal 311 were attached to the groove 313 of the bottomed metallic case 308. The entire circumference of the open end 314 of the bottomed metallic case 308 was swaged and sealed.

(1) Manufacturing of the Negative Electrode Plate 303
Process (i)

First, carboxymethyl cellulose (hereinafter, CMC; having molecular weight of 400,000), which was a water-soluble polymer, was dissolved in water to obtain a water solution having CMC concentration of 1 weight %. 100 parts by weight of natural graphite particles (having an average particle diameter of 20 μm, an average circularity degree of 0.92, and a specific surface area of 4.2 m²/g) and 100 parts by weight of the CMC water solution were mixed and agitated while controlling the temperature of a mixture to 25° C. Thereafter, the mixture was dried for five hours at 120° C. to obtain a dried mixture. In the dried mixture, a CMC amount per 100 parts by weight of the graphite particles was 1 part by weight.

Process (ii)

101 parts by weight of the obtained dried mixture, 0.6 part by weight of a binder (hereinafter, SBR) formed in a particle state with an average particle diameter of 0.12 μm, including a styrene unit and a butadiene unit, and having rubber elasticity, 0.9 part by weight of carboxymethyl cellulose, and an appropriate amount of water were mixed to prepare a negative electrode mixture slurry. Note that the SBR was mixed with other components in a state of emulsion (BM-400B (a commodity name) manufactured by Zeon Corporation having an SBR weight ratio of 40 weight %) having water as a dispersion medium.

Process (iii)

The obtained negative electrode mixture slurry was applied to both surfaces of an electrolytic copper foil (having thickness of 12 μm), which was a negative electrode core material, using die-coating. A coating film was dried at 120° C. The weight of the applied negative electrode mixture was designed and determined such that the SOC at a switching position of the 1st stage and the 2nd stage in the crystal state of the graphite when the battery was charged at 4.2 V was 60%. A battery including a negative electrode plate and including a Li metal foil in a counter electrode was made in advance, charging and discharging were performed in the battery, and a voltage and a capacity were measured. The switching position was designed on the basis of values of the voltage and the capacity.

Thereafter, the dried coating film was rolled through rolls at a linear pressure of 0.25 ton/cm to form a negative electrode mixture layer having thickness of 160 μm and graphite density of 1.65 g/cm$^3$. The negative electrode mixture layer was cut into a predetermined shape together with the negative electrode core material, whereby a negative electrode was obtained.

(2) Manufacturing of the Positive Electrode Plate 301

4 parts by weight of polyvinylidene fluoride (PVDF), as binder, was added to 100 parts by weight of LiNi$_{0.80}$Co$_{0.15}$Al$_{0.05}$O$_2$, which was a positive electrode active material, and mixed with an appropriate amount of N-methyl-2-pyrrolidone (NMP) to prepare a positive electrode mixture slurry. The obtained positive electrode mixture slurry was applied to both surfaces of an aluminum foil having thickness of 20 μm, which was a positive electrode core material, using die-coating. A coating film was dried and further rolled to form a positive electrode mixture layer. The positive electrode mixture layer was cut into a predetermined shape together with the positive electrode core material, whereby a positive electrode was obtained.

(3) Preparation of a Nonaqueous Electrolyte

LiPF$_6$ was dissolved at concentration of 1 mol/litter in a mixed solvent containing ethylene carbonate (EC), ethylmethyl carbonate (EMC), and dimethyl carbonate (DMC) at a weight ratio of $V_{EC}$:$V_{EMC}$:$V_{DMC}$=20:20:60 to create a nonaqueous electrolyte.

(4) Manufacturing of a Closed Nonaqueous Electrolyte Secondary Battery 1

The separator 305 having a thickness of 20 μm was arranged between the positive electrode plate 301 and the negative electrode plate 303 and wound to configure the cylindrical electrode plate group 312. Thereafter, the electrode plate group 312 was inserted into the bottomed metallic case 308 together with the upper insulating plate 306 and the lower insulating plate 307, and sealed to complete the battery 3, whereby the lithium ion secondary battery 1 (FIG. 3), which was a closed nonaqueous electrolyte secondary battery, was obtained. The battery was a cylindrical battery having a diameter of 18 mm and a height of 65 mm. A designed capacity of the battery was 2750 mAh. A heat shrink tube made of polyethylene terephthalate having a thickness of 80 μm was overlaid on the completed battery 3 as a battery can insulator 33 up to a top surface outer edge portion and heat-shrunk by warm air having a temperature of 90° C. to obtain a completed battery.

<Evaluation of the Battery>

(1) Measurement of DC-IR

Pulse charging was performed on the closed nonaqueous electrolyte secondary battery 1 from a discharged state with a current value of 1.375 A (0.5 It) in a charging direction, and DC-IR was measured at every 10% of an SOC. As a result, the resistance profile shown in FIG. 1 was obtained. The ordinate indicates the DC-IR and the abscissa indicates the SOC. Measurement was also performed at 0.55 A (0.2 It) and 5.5 A (2 It). Values substantially the same as the values in the measurement at 1.375 A were obtained.

As shown in FIG. 1, an increase in the DC-IR was confirmed at the SOC not more than 30%, at the SOC of 60%, and at the SOC not less than 90% by the above measurement. In particular, it is seen that the increase at the SOC of 60% occurred only in the pulse charging at the pulse time (the pulse width of ON) not less than 10 seconds. The increase occurred only in the pulse charging at the pulse time (the pulse width of ON) not less than 10 seconds. Hence, it is seen that the DC-IR is a resistance component that develops relatively late. Therefore, it is anticipated that this resistance component is not moving resistance of lithium ions in an electrolyte but moving resistance of the lithium ions in a solid phase in an active material.

The closed nonaqueous electrolyte secondary battery 1 is the battery designed such that the switching position of the 1st stage and the 2nd stage in the crystal state of the graphite is the SOC of 60%. Therefore, it was confirmed that a region in which a DC-IR value increases in a period other than a charging initial period and a charging end period coincided with the switching position of the 1st stage and the 2nd stage in the crystal stage of the graphite.

(2) Evaluation of a Cycle Capacity Maintenance Ratio

A battery charging and discharging cycle was performed on the closed nonaqueous electrolyte secondary battery 1 according to charging conditions shown in FIG. 5 to FIG. 7. As current values in FIG. 5 to FIG. 7, a current value with which an entire capacity could be discharged in one hour when the closed nonaqueous electrolyte secondary battery 1 was discharged was set to 1 It. That is, in the case of the closed nonaqueous electrolyte secondary battery 1, 1 It=2.75 A and 0.5 It=1.375 A.

As shown in FIG. 5 to FIG. 7, the SOC was divided into four regions depending on values of the SOC. The charging control was performed changing electric current or watt in the respective regions. Specifically, the SOC was divided into four regions, that is, a region from the SOC of 0% to the SOC of 40%, a region (a region A) from the SOC of 40% to the SOC of 60%, a region from the SOC of 60% to the SOC of 80%, and a region from the SOC of 80% to a charging voltage of 4.2 V. Boundaries of the regions of the SOC for performing the above charging control were determined according to values of electric quantities obtained by integrating a charging current with time. The electric quantities of the respective SOC regions were determined with a battery capacity confirmed in the initial period set to 100%. In the constant voltage (CV) charging performed after the constant current (CC) charging or the constant watt (CW) charging, the constant voltaging charge was performed at 4.2 V up to a charging cut current of 50 mA.

An initial battery capacity was confirmed as described below. The constant current charging was performed at a constant current of 1.375 A up to 4.2 V. Thereafter, an electric current was limited to keep a constant voltage of 4.2 V. The constant voltage charging was finished at a point when the limited current decreased to 0.05 A. Thereafter, after suspension for twenty minutes, discharging was performed at 0.55 A until a battery voltage decreases to 2.5 V. A discharge electric quantity at this point was set as the initial battery capacity.

The charging and discharging cycle was performed under a condition that discharging was performed at a constant current of 2.75 A and the discharging was finished at 2.5 V. Suspension for twenty minutes was performed in each of the ends of the charging and the discharging.

Assuming that a discharge capacity in a third cycle is 100%, a discharge capacity at the time when 100 cycles elapsed was set as a cycle capacity maintenance ratio [%]. Results are shown in FIG. 5 to FIG. 7.

FIG. 5 shows comparative examples 1 to 3 and working examples 1 to 10. It is seen from the comparative examples 1 and 2 shown in FIG. 5 that the life characteristics of the closed nonaqueous electrolyte secondary battery 1 are excessively deteriorated at a charging current not less than 0.5 It. At 0.3 It, the closed nonaqueous electrolyte secondary battery 1 shows extremely satisfactory life characteristics.

In the comparative example 3 shown in FIG. 5, a charging current was reduced in a stepwise manner. However, it is confirmed that, although a charging time was not reduced so much, a cycle life was deteriorated.

In the working examples 1 to 3 shown in FIG. 5, a current value in the region A was set to 0.3 It, at which cycle characteristics were satisfactory in the comparative examples, and charging currents in the other regions were set large. Accordingly, the charging and discharging cycle was performed for a charging time substantially the same as or shorter than the charging time at 0.5 It of the comparative example 1. In all the working examples 1 to 3, although the charging time was shorter than the charging time in the comparative example 1, a satisfactory result was obtained concerning the cycle characteristics.

When the working examples 1 to 3 are compared, it is seen that, in a region further on the charging side than the region A (i.e., a region in which the SOC is higher than the SOC in the region A), the cycle characteristics tend to be better when the charging current is smaller. As it is seen when the working examples 3 and 4 are compared, in a region further on the discharging side than the region A (i.e., a region in which the SOC is lower than the SOC in the region A), the cycle characteristics were not improved much even if the charging current was reduced.

Consequently, it is preferable that, as a charging current, a current value before the region A (i.e., a region of a charging initial period in which the SOC is low) is set the largest, that a smallest current value is set in the region A, and that a current value larger than the current value in the region A and smaller than the current value in the charging initial period is set in the region further on the charging side than the region A (i.e., the region in which the SOC is high).

By comparing the working examples 5 to 10 with the working examples 1 to 4, it is confirmed that a limiting current that should be fed in the region A changes when an environmental temperature changes. Specifically, as temperature is higher, satisfactory cycle characteristics may be secured even if a current value is increased. When the temperature is low, on the contrary, the current value needs to be reduced. Therefore, it is desirable to control the current value according to the environmental temperature or the temperature of the battery.

FIG. 6 shows a comparative example 4 and working examples 11 and 12. In the comparative example 4 and the working examples 11 and 12 shown in FIG. 6, constant watt charging was performed. To facilitate comparison, in the comparative example 4, an average current value was set to be near 0.5 It as in the comparative example 1. In the working examples 11 and 12, average current values are set to be near those in the working examples 2 and 3, respectively.

In the constant watt charging, when the voltage of the battery increases according to charging, a current value is reduced so that wattage is kept constant. Therefore, the constant watt charging may be considered to be a control method for applying a fewer load to the battery than the constant current charging. In the constant voltage charging, since an electric current suddenly falls when the voltage reaches a set voltage, charging with a target current value is difficult. On the other hand, in the case of the constant watt charging, since a change in an electric current is gentle, control of a current value is easy.

The same tendency was obtained in both of the constant watt charging and the constant current charging from the results shown in FIG. 5 and FIG. 6. However, it was found that deterioration tended to be further suppressed in the constant watt charging than in the constant current charging.

FIG. 7 shows working examples 2 and 13. In the working example 13 shown in FIG. 7, a charging and discharging cycle was started under conditions same as the conditions in the working example 2. However, a capacity at a point of 500 cycles was 70% of the initial battery capacity. Therefore, at this point, measurement of DC-IR was performed again and a place (an electric quantity) for changing setting of a current value was reset at every SOC including the region A. Then, in the working example 2 in which the place is not reset, a capacity maintenance ratio at 600 cycles suddenly falls. On the other hand, in the working example 13, the region A was reconsidered at the point of 500 cycles, whereby a sudden fall of the capacity was suppressed. This is considered to be because, in the working example 2, the region (2) (FIG. 2) where the DC-IR increases deviated from the region A according to a decrease in a battery capacity and charging with a large current value was carried out in the region (2) (FIG. 2). That is, it is desirable to reset the region A according to a deterioration state of the battery.

If the region A is set wide, even if the battery is deteriorated a little, it takes time until the region (2) deviates from the region A. Therefore, the frequency of the reset may be reduced. On the other hand, if the region A is too wide, an excessive charging time is consumed. It is preferable that the width of the region A is set as short as possible according to how frequently the DC-IR of the battery may be measured and the region A may be reset in actual use.

Note that the specific embodiment and the working examples described above mainly include inventions having configurations described below.

A lithium ion battery charging method according to an aspect of the present invention is a lithium ion battery charging method which performs constant current charging of a lithium ion battery. The constant current charging includes at least three consecutive charging stages. The at least three consecutive charging stages include consecutive first, second, and third charging stages. The second charging stage has a set current value which is set lower than set current values of the first and third charging stages.

With this configuration, the constant current charging includes the at least three consecutive charging stages. The at least three consecutive charging stages include the consecutive first, second, and third charging stages. The second charging stage has the set current value which is set lower than the set current values of the first and third charging stages. The set current value of the second charging stage is set low in this way. Hence, in the second charging stage, it is possible to reduce a degree of deterioration of the lithium ion battery.

A lithium ion battery charging method according to another aspect of the present invention is a lithium ion battery charging method which performs constant watt charging of a lithium ion battery. The constant watt charging includes at least three consecutive charging stages. The at least three consecutive charging stages include consecutive first, second, and third charging stages. The second charging stage has a set watt value which is set lower than set watt values of the first and third charging stages.

With this configuration, the constant watt charging includes the at least three consecutive charging stages. The at least three consecutive charging stages include the consecutive first, second, and third charging stages. The second charging stage has the set watt value which is set lower than the set watt values of the first and third charging stages. The set watt value of the second charging stage is set low in this way. Hence, in the second charging stage, it is possible to reduce a degree of deterioration of the lithium ion battery.

In the above lithium ion battery charging method, a negative electrode active material of the lithium ion battery may include graphite. The second charging stage may be performed under a charging state in which there is a change in a crystal state of the graphite.

With this configuration, the negative electrode active material of the lithium ion battery includes the graphite. The second charging stage is performed under a charging state in which there is a change in a crystal state of the graphite. The set current value of the second charging stage is set lower than the set current values of the first and third charging stages. The set watt value of the second charging stage is set lower than the set watt values of the first and third charging stages. Therefore, under the charging state in which there is a change in a crystal state of the graphite, it is possible to reduce a degree of deterioration of the lithium ion battery.

In the above lithium ion battery charging method, under irregular and repetitive control of charging and discharging, an upper limit value of the set current value or the set watt value during charging in the second charging stage may be set lower than upper limit values of the set current values or the set watt values during charging in the first and third charging stages.

With this configuration, under irregular and repetitive control of charging and discharging, the upper limit value of the set current value during charging in the second charging stage is set lower than the upper limit values of the set current values during charging in the first and third charging stages. Under irregular and repetitive control of charging and discharging, the upper limit value of the set watt value during charging in the second charging stage is set lower than the upper limit values of the set watt values during charging in the first and third charging stages. Therefore, it is possible to reduce a degree of deterioration of the lithium ion battery.

In the above lithium ion battery charging method, the second charging stage may include one or more suspension periods in which charging is suspended.

With this configuration, the second charging stage includes one or more suspension periods in which charging is suspended. Therefore, movement of lithium ions to the negative electrode progresses during the suspension period. Consequently, it is possible to reduce a degree of deterioration of the lithium ion battery due to a delay of the movement of the lithium ions to the negative electrode.

In the above lithium ion battery charging method, the set current value or the set watt value may depend on a temperature of the lithium ion battery or an ambient temperature of the lithium ion battery.

With this configuration, the set current value or the set watt value depends on the temperature of the lithium ion battery or the ambient temperature of the lithium ion battery. Therefore, the set current value or the set watt value may be changed to an appropriate value corresponding to the temperature of the lithium ion battery or the ambient temperature of the lithium ion battery. As a result, it is possible to efficiently charge the lithium ion battery.

A battery-equipped device according to an aspect of the present invention includes: a lithium ion battery; and a charging controller which is configured to control charging of the lithium ion battery using the above lithium ion battery charging method. With this configuration, the charging of the lithium ion battery is controlled by the charging controller using the above lithium ion battery charging method. Therefore, it is possible to reduce a degree of deterioration of the lithium ion battery. As a result, it is possible to use the battery-equipped device for a long period.

INDUSTRIAL APPLICABILITY

The present invention is useful in, for example, nonaqueous electrolyte secondary batteries used in power supplies of electronic devices such as a cellular phone, a personal computer, a digital still camera, a game device, and a portable audio device and vehicles such as an electric vehicle and a hybrid electric vehicle (HEV). However, applicable fields of the present invention are not limited to these.

The invention claimed is:

1. A lithium ion battery charging method which performs constant current charging of a lithium ion battery, wherein
    the constant current charging includes at least three consecutive charging stages,
    the at least three consecutive charging stages include consecutive first, second, and third charging stages,
    a negative-electrode active material of the lithium ion battery includes graphite, and
    the second charging stage has a set current value which is set lower than set current values of the first and third charging stages, and is performed under a charging state in which there is a change in a crystal state of the graphite.

2. The lithium ion battery charging method according to claim 1, wherein an upper limit value of the set current value during charging in the second charging stage is set lower than upper limit values of the set current values or the set watt values during charging in the first and third charging stages, under irregular and repetitive control of charging and discharging.

3. The lithium ion battery charging method according to claim 1, wherein the second charging stage includes one or more suspension periods in which charging is suspended.

4. The lithium ion battery charging method according to claim 1, wherein the set current value depends on a temperature of the lithium ion battery or an ambient temperature of the lithium ion battery.

5. A battery-equipped device comprising:
    a lithium ion battery; and
    a charging controller which is configured to control charging of the lithium ion battery using the lithium ion battery charging method according to claim 1.

6. The lithium ion battery charging method according to claim 1, wherein
    a diffraction image of the graphite particles measured by a wide angle X-ray diffraction method has a peak attributed to a (101) plane and a peak attributed to a (100) plane, and
    a ratio of intensity I (101) of the peak attributed to the (101) plane and intensity I (100) of the peak attributed to the (100) plane satisfies $0.01<I(101)/I(100)<0.25$.

7. The lithium ion battery charging method according to claim 1, wherein
    a diffraction image of the graphite particles measured by a wide angle X-ray diffraction method has a peak attributed to a (101) plane and a peak attributed to a (100) plane, and
    a ratio of intensity I (101) of the peak attributed to the (101) plane and intensity I (100) of the peak attributed to the (100) plane satisfies $0.08<I(101)/I(100)<0.2$.

8. A lithium ion battery charging method which performs constant watt charging of a lithium ion battery, wherein
    the constant watt charging includes at least three consecutive charging stages,
    the at least three consecutive charging stages include consecutive first, second, and third charging stages,
    a negative-electrode active material of the lithium ion battery includes graphite, and
    the second charging stage has a set watt value which is set lower than set watt values of the first and third charging stages, and is performed under a charging state in which there is a change in a crystal state of the graphite.

9. The lithium ion battery charging method according to claim 8, wherein an upper limit value of the set watt value during charging in the second charging stage is set lower than upper limit values of the set current values or the set watt values during charging in the first and third charging stages, under irregular and repetitive control of charging and discharging.

10. The lithium ion battery charging method according to claim 8, wherein the second charging stage includes one or more suspension periods in which charging is suspended.

11. The lithium ion battery charging method according to claim 8, wherein the set watt value depends on a temperature of the lithium ion battery or an ambient temperature of the lithium ion battery.

12. A battery-equipped device comprising:
a lithium ion battery; and
a charging controller which is configured to control charging of the lithium ion battery using the lithium ion battery charging method according to claim 8.

13. The lithium ion battery charging method according to claim 8, wherein
a diffraction image of the graphite particles measured by a wide angle X-ray diffraction method has a peak attributed to a (101) plane and a peak attributed to a (100) plane, and
a ratio of intensity I (101) of the peak attributed to the (101) plane and intensity I (100) of the peak attributed to the (100) plane satisfies $0.01 < I(101)/I(100) < 0.25$.

14. The lithium ion battery charging method according to claim 8, wherein
a diffraction image of the graphite particles measured by a wide angle X-ray diffraction method has a peak attributed to a (101) plane and a peak attributed to a (100) plane, and
a ratio of intensity I (101) of the peak attributed to the (101) plane and intensity I (100) of the peak attributed to the (100) plane satisfies $0.08 < I(101)/I(100) < 0.2$.

* * * * *